UNITED STATES PATENT OFFICE.

JOSIAH MILLER, OF MOORE TOWNSHIP, NORTHAMPTON COUNTY, PA., ASSIGNOR TO HARRISON TRUMBOWER AND WM. C. KLEPPINGER.

IMPROVED COMPOSITION FOR PAINT.

Specification forming part of Letters Patent No. 39,202, dated July 7, 1863.

*To all whom it may concern:*

Be it known that I, JOSIAH MILLER, of Moore township, in the county of Northampton, in the State of Pennsylvania, have invented a new and Improved Mode of Mixing Paint; and I do hereby declare that the following is a full and exact description thereof, reference being had to the specimens now in the Patent Office at Washington.

The nature of my invention consists in making paint from the following ingredients, to wit: linseed-oil, alum, cream of tarter, saltpeter, flour paste, and water.

To enable others skilled in the art to make and use my invention, I will proceed to describe the manner of mixing the paint and its operation.

I mix my paint from the following proportions of the ingredients hereinbefore specified, and to make sixteen gallons of paint I take five gallons of linseed-oil, one pound of alum, one-half pound cream of tarter, one ounce of saltpeter, four pounds of flour-paste, and eleven gallons of water. With the paint thus mixed it can be used for any and all purposes for which mixed paints are usually employed.

What I claim as my invention, and desire to secure by Letters Patent, is—

A paint mixture prepared substantially as hereinbefore set forth.

JOSIAH MILLER.

In presence of—
WILSON WEAVER,
J. D. LAWALL.